US009084307B2

(12) United States Patent
Fujita

(10) Patent No.: US 9,084,307 B2
(45) Date of Patent: Jul. 14, 2015

(54) LIGHT EMITTING DEVICE, DISPLAY DEVICE, LIGHT EMITTING COMPONENT DRIVER CIRCUIT, AND METHOD OF DRIVING LIGHT EMITTING COMPONENT

(75) Inventor: Tsukasa Fujita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 353 days.

(21) Appl. No.: 13/812,592

(22) PCT Filed: Jun. 15, 2011

(86) PCT No.: PCT/JP2011/063670
§ 371 (c)(1),
(2), (4) Date: Mar. 18, 2013

(87) PCT Pub. No.: WO2012/014588
PCT Pub. Date: Feb. 2, 2012

(65) Prior Publication Data
US 2013/0169190 A1 Jul. 4, 2013

(30) Foreign Application Priority Data

Jul. 29, 2010 (JP) ................................. 2010-170653

(51) Int. Cl.
*H05B 37/00* (2006.01)
*H05B 37/02* (2006.01)
*G09G 3/34* (2006.01)
*G02F 1/1335* (2006.01)

(52) U.S. Cl.
CPC ................ *H05B 37/02* (2013.01); *G09G 3/342* (2013.01); *G02F 1/133603* (2013.01); *G02F 2001/133612* (2013.01); *G09G 2320/064* (2013.01); *G09G 2330/02* (2013.01); *G09G 2330/021* (2013.01)

(58) Field of Classification Search
None
See application file for complete search history.

(56) References Cited

U.S. PATENT DOCUMENTS 8,502,472 B2 * 8/2013 Chang et al. .................. 315/307
8,558,479 B2 * 10/2013 Kawata et al. ................ 315/291

(Continued)

FOREIGN PATENT DOCUMENTS

JP     2006-319221 A    11/2006
JP     2009-141240 A    6/2009
JP     2010-056305 A    3/2010

OTHER PUBLICATIONS

International Search Report corresponding to PCT/JP2011/063670, dated Sep. 20, 2011.

*Primary Examiner* — Long Nguyen
(74) *Attorney, Agent, or Firm* — Lowe Hauptman & Ham, LLP

(57) ABSTRACT

A light emitting device includes light emitting component sets, a voltage measurement circuit, a voltage generator, and a drive controller. The voltage measurement circuit is configured to measure voltages at connecting points between light emitting component lines and drive switches. The voltage generator includes a plurality of smoothing capacitors for the light emitting component sets, respectively. The voltage generator is configured to generate a drive voltage applied to the light emitting component sets using one of the smoothing capacitors. The drive controller is configured to select the smoothing capacitor corresponding to the light emitting component set, the measured voltage of which is the lowest among the light emitting component sets on which lighting control is performed to alter the drive voltage according to alteration of the lighting control. The drive controller is configured to control the voltage generator to generate the drive voltage using the selected smoothing capacitor.

10 Claims, 4 Drawing Sheets

(56) References Cited

U.S. PATENT DOCUMENTS

| | | |
|---|---|---|
| 2006/0255753 A1 | 11/2006 | Sawada et al. |
| 2009/0146932 A1 | 6/2009 | Osaka |
| 2010/0052572 A1* | 3/2010 | Kataoka et al. ............... 315/297 |

* cited by examiner

US 9,084,307 B2

LIGHT EMITTING DEVICE, DISPLAY DEVICE, LIGHT EMITTING COMPONENT DRIVER CIRCUIT, AND METHOD OF DRIVING LIGHT EMITTING COMPONENT

RELATED APPLICATIONS

The present application is a National Phase of International Application Number PCT/JP2011/063670, filed Jun. 15, 2011, and claims priority from Japanese Application Number 2010-170653, filed Jul. 29, 2010.

TECHNICAL FIELD

The present invention relates to a light emitting device, a display device, a light emitting component driver circuit, and a method of driving light emitting component.

BACKGROUND ART

In recent years, backlight units including conventional cold cathode fluorescent tubes (CCFLs) and backlight units including a plurality of light emitting diodes (LEDs), which are hereinafter referred to as LED backlights, are widely used as backlight units (light emitting devices) for display devices such as liquid crystal display devices.

In general, forward voltages of LED components vary from one another due to variations among the LED components. In an LED backlight unit, lines of LED components are connected in parallel to each other. The LED components in each line are connected in series and driven with a common drive voltage. During the driving of the LED components, forward voltages Vf of the LED component lines vary due to the variations among the LED components. The variations in forward voltage Vf of the LED component lines cause an unnecessary drive power loss. A technology for reducing such an unnecessary drive power loss is disclosed in Patent Document 1. Differences in drive voltage caused by variations in forward voltage Vf of LED component lines are determined and a common drive voltage applied to the LED component lines is properly adjusted, that is, negative feedback control is performed.

RELATED ART DOCUMENT

Patent Document

Patent Document 1: Japanese Unexamined Patent Application Publication No. 2010-56305

Problem to be Solved by the Invention

According to the technology disclosed in the above document, an abnormal output voltage increase or decrease immediately after switching of the common drive voltage when the LED components in all lines are turned off. Namely, the LED components in all lines need to be off to reduce the power consumption by the LED backlight. Therefore, a method for properly reducing a power loss due to alteration of a drive voltage in a light emitting device including display components, forward voltages Vf of which vary from one another, is needed.

DISCLOSURE OF THE PRESENT INVENTION

The present invention was made in view of the foregoing circumstances. An object of the present invention is to provide a light emitting device in which a power loss due to alteration of a drive voltage is properly reduced.

Means for Solving the Problem

To solve the above problem, a light emitting device according to the present invention includes a plurality of light emitting component sets, a voltage measurement circuit, a voltage generator, and a drive controller. Each light emitting component set includes a light emitting component line and a drive switch. The light emitting component line includes the predetermined number of light emitting components connected in series. The drive switch is connected in series with the light emitting component line and configured to drive the light emitting component line. The voltage measurement circuit is configured to measure a voltage at a connecting point between the light emitting line and the drive switch in each light emitting component set. The voltage generator includes a plurality of smoothing capacitors for the light emitting component sets, respectively, and configured to generate a drive voltage to be applied to the light emitting component sets using any one of the smoothing capacitors. The drive controller is configured to control the voltage generator based on the measured voltages by the voltage measurement circuit. The drive controller is further configured to: select the smoothing capacitor corresponding to the light emitting component set, the measured voltage of which is the lowest among the at least one of light emitting component sets on which lighting control is performed, to alter the drive voltage according to the lighting control on the light emitting component sets; and control the voltage generator to generate the drive voltage using the selected smoothing capacitor as the one of the smoothing capacitors.

A light emitting component drive circuit according to the present invention is configured to drive a plurality of light emitting component sets. Each light emitting component set includes a light emitting component line and a drive switch. The light emitting component line includes a predetermined number of light emitting components connected in series. The drive switch is connected in series with the light emitting component line and configured to drive the light emitting component line. The light emitting component drive circuit includes a voltage measurement circuit, a voltage generator, and a drive controller. The voltage measurement circuit is configured to measure a voltage at a connecting point between the light emitting component line and the drive switch in each light emitting component set. The voltage generator includes a plurality of smoothing capacitors for the light emitting component sets, respectively, and configured to generate a drive voltage applied to the light emitting component sets using any one of the smoothing capacitors. The drive controller is configured to control the voltage generator based on the measured voltages by the voltage measurement circuit. The drive controller is further configured to: select one of the smoothing capacitors corresponding to the light emitting-component set, the measured voltage of which is the lowest among the at least one of light emitting component sets on which lighting control is performed, to alter the drive voltage according to the lighting control on the light emitting component sets; and control the voltage generator to generate the drive voltage using the selected smoothing capacitor as the one of the smoothing capacitors.

A method is provided for driving light emitting component sets. Each set includes a light emitting component line and a drive switch. The light emitting component line includes the predetermined number of light emitting components connected in series. The drive switch is connected in series with the light emitting component line and configured to drive the light emitting component line. The method according to the present invention includes: providing a plurality of smoothing capacitors for the light emitting component sets, respectively; measuring a voltage at a connecting point between the light emitting component line and the drive switch in each light emitting component set; selecting the smoothing capacitor corresponding to the light emitting component set, the measured voltage in the voltage measurement step is the lowest, among the at least one of smoothing capacitors on which lighting control is performed to alter a drive voltage commonly applied to the plurality of light emitting sets according to the lighting control on the light emitting component sets; generating the drive voltage using the smoothing capacitor selected in the selecting step; and driving at least one of the light emitting component sets on which the lighting control is performed using the drive voltage generated in the generating step.

According to the above configurations, a plurality of the smoothing capacitors are provided for the light emitting component sets, respectively. To alter the drive voltage according to the lighting control on the light emitting components, the smoothing capacitor, the measured voltage of which is the lowest, is selected from the at least one of light emitting component sets on which lighting control is performed. Namely, the smoothing capacitor corresponding to the light emitting set including the light emitting line, the forward voltage of which is the highest, is selected. The drive voltage is generated using the selected smoothing capacitor. To reduce the drive voltage, the smoothing capacitors are switched among them while the smoothing capacitors are maintained at the desired charge voltage. In comparison to the configuration in which the smoothing capacitors are not switched, the drive voltage can be promptly altered and thus the power loss due to the alteration of the drive voltage can be properly reduced.

Furthermore, the promptness in the alternation of the drive voltage is ensured through the switching of the smoothing capacitors. Therefore, the smoothing capacitors with large capacitance can be used and thus ripples due to switching can be reduced.

The voltage generator may include a capacitor switching section for using the any one of the smoothing capacitors among the plurality of smoothing capacitors.

With this configuration, the smoothing capacitor to be used can be properly selected.

The capacitor switching section may include capacitor switching sections for the smoothing capacitors, respectively. The drive controller may be configured to control the capacitor switching sections to generate the drive voltage by the voltage generator by using the selected smoothing capacitor to alter the drive voltage.

With this configuration, the smoothing capacitors can be switched among them while charges and discharges of the smoothing capacitors are individually controlled.

Each of the capacitor switching sections may include a charging switch and a discharging switch. The charging switch may be for charging the corresponding smoothing capacitor. The discharging switch may be for discharging the corresponding smoothing capacitor. The drive controller may be configured to control the charging switch and the discharging switch to make the voltage generator to use the selected smoothing capacitor for generating the drive voltage.

With this configuration, the smoothing capacitors can be switched among them while charges and discharges of the smoothing capacitors are properly controlled.

The drive controller may be configured to control the charging switches and the discharging switches corresponding to the smoothing capacitors such that the unselected smoothing capacitors remain charged substantially at predetermined charge voltages corresponding to the unselected smoothing capacitors, respectively.

With this configuration, time required for altering the drive voltage can be reduced.

The light emitting components may be light emitting diodes.

A display device according to the present invention may include the above light emitting device and a display panel configured to provide display using light from the light emitting device.

With this configuration, if the light emitting device is used as a backlight for the display panel, the power consumption of the backlight can be reduced and thus the power consumption of the display panel can be reduced.

The display panel may be a light crystal display panel including liquid crystals.

With this configuration, the power consumption of the liquid crystal display panel can be reduced.

Advantageous Effect of the Invention

According to the light emitting device, the light emitting component drive circuit, and the method of driving the light emitting components, the power loss due to the alteration of the drive voltage can be properly reduced.

MODE FOR CARRYING OUT THE INVENTION

Figure 1:
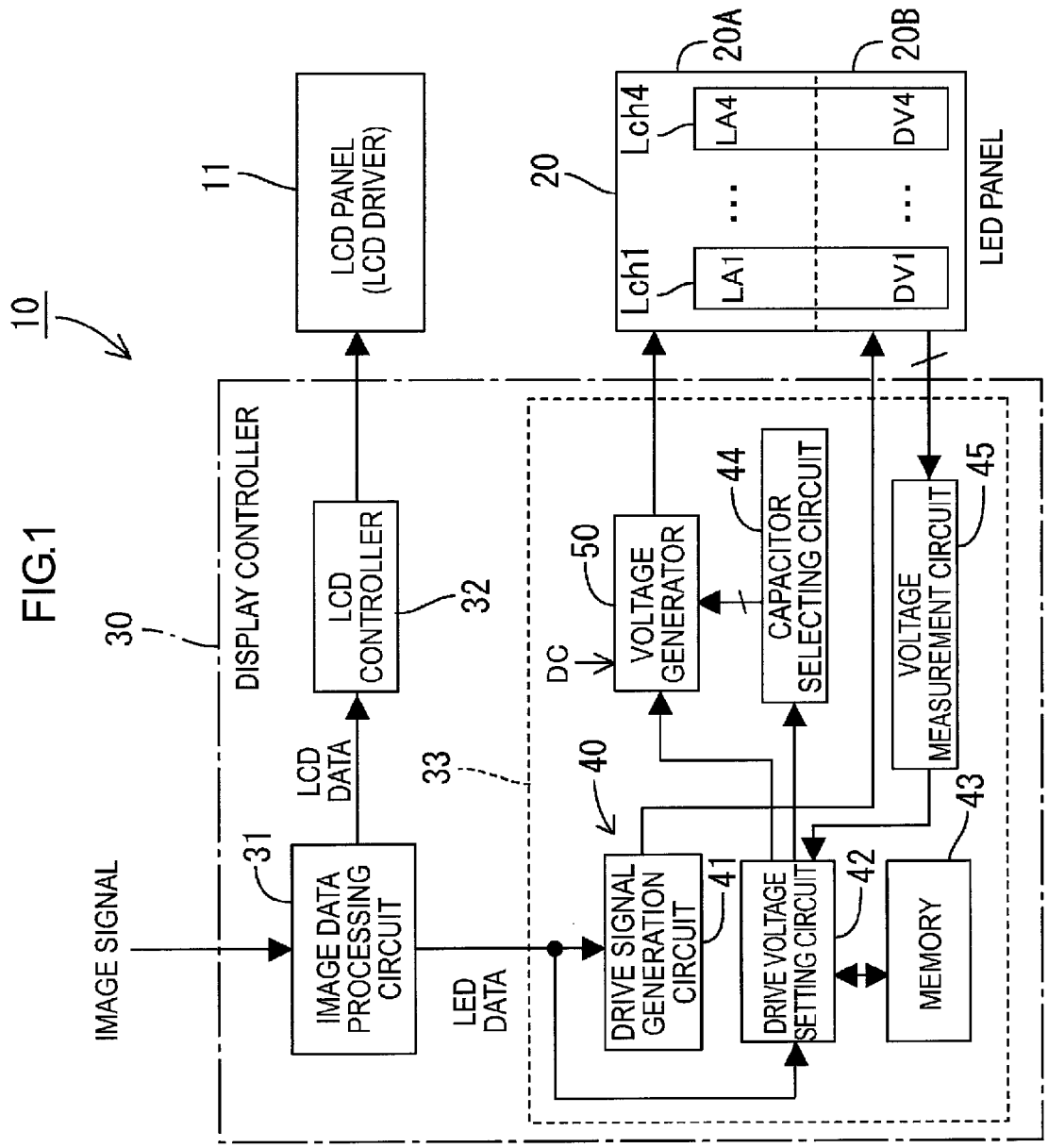
FIG. 1 is a block diagram schematically illustrating an electrical configuration of a liquid crystal device according to an embodiment of the present invention.
Figure 2:
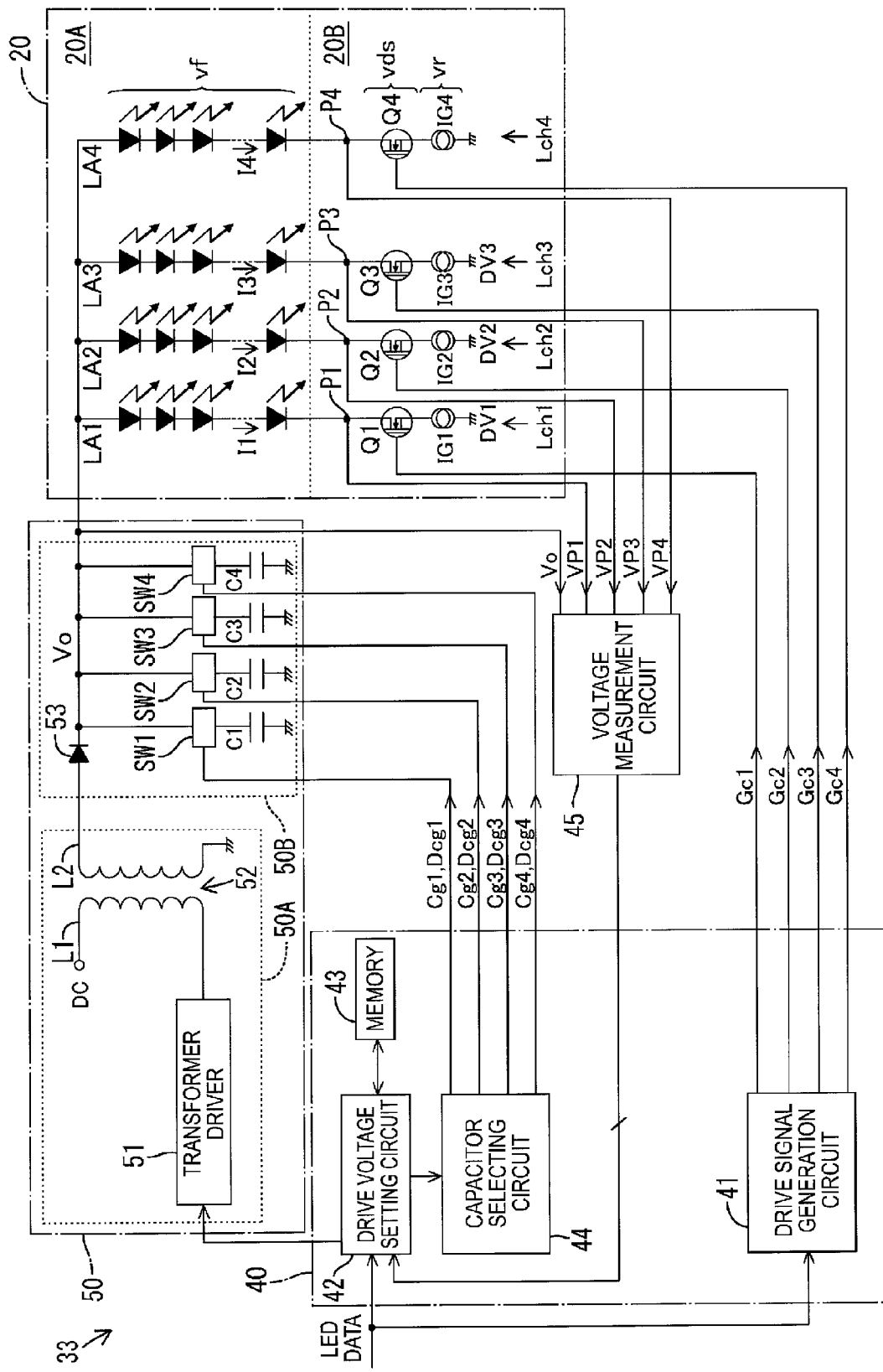
FIG. 2 is a block diagram schematically illustrating an electrical configuration of an LED backlight included in the liquid crystal device.

An embodiment of the present invention will be explained with reference to FIGS. 1 to 4. A liquid crystal display device (an example of a display device) including a liquid crystal panel as a display panel will be explained. FIG. 1 is a block diagram that schematically illustrates an electrical configuration of the liquid crystal display device. FIG. 2 is a block diagram that schematically illustrates an electrical configuration of an LED backlight 15 (an example of a light emitting device).

1. Configuration of Liquid Crystal Display Device

As illustrated in FIG. 1, a liquid crystal display 10 includes a liquid crystal panel 11 (an example of a display panel), an LED panel 20, and a display controller 30.

The liquid crystal panel (LCD panel) 11 has a rectangular plan view shape. The liquid crystal panel 11 includes a pair of glass substrates arranged predetermined distance away from each other and bonded together, and liquid crystals sealed between the glass substrates.

On one of the glass substrates, switching components (e.g., thin film transistors, TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes and an alignment film are provided. Polarizing plates are attached to outer surfaces of the glass substrates.

According to this configuration, 1920×1080 color pixels for high-definition image display are provided in the liquid crystal panel 11. The liquid crystal panel 11 includes an LCD driver and switching components for each pixel. The switching components are driven by the LCD driver. The LED panel 20 includes a light emitting section 20A and a driver section 20B. As illustrated in FIG. 2, the light emitting section 20A includes a plurality of (four in this embodiment) LED lines (light emitting component lines LA1 to LA4). Each LED line includes the predetermined number of white diodes (an example of light emitting components, hereinafter referred to as LEDs) connected in series.

The driver section 20B includes a plurality of (four in this embodiment) drive circuits (DV1 to DV4) connected in series with the respective LED lines LA and configured to drive the respective LED lines LA. The drive circuits (DV1 to DV4) include drive switches (Q1 to Q4) and current control circuits (IG1 to IG4), respectively. The drive switches may be field effect transistors (FETs). The current control circuits may be constant current supplies.

Each LED line LA and the corresponding drive circuit DV form an LED channel (light emitting component sets Lch1 to Lch4). In the LED panel 20, lighting control (e.g., local dimming) is individually performed on each LED channel. Currents that flow through the LED channels (I1 to I4) are controlled by the current control circuits (IG1 to IG4) to remain constant so that predetermined levels of light emitting brightness can be achieved when the LED channels are turned on.

The display controller 30 includes an image data processing circuit 31, an LCD controller 32, and an LED controller (an example of a light emitting component drive circuit according to the claimed invention).

The image data processing circuit 31 is configured to receive an image signal (image data) from a television tuner, to determine light emitting brightness data (hereinafter referred to as LED data) of each LED line (LA1, LA2, LA3 or LA4) based on the image signal, and to supply the LED data to the LED controller 33. In this embodiment, the drive switches (Q1 to Q4) for the LED lines (LA1 to LA4) are open or closed according to PWM (pulse width modulation) signals.

The image data processing circuit 31 is configured to generate LCD data based on the image signal and supplies the LCD data to the LCD controller 32. The LCD data is light transmission rate data for each pixel of the LCD panel 11.

2. Configuration of LED Backlight (Light Emitting Device)

Figure 3:
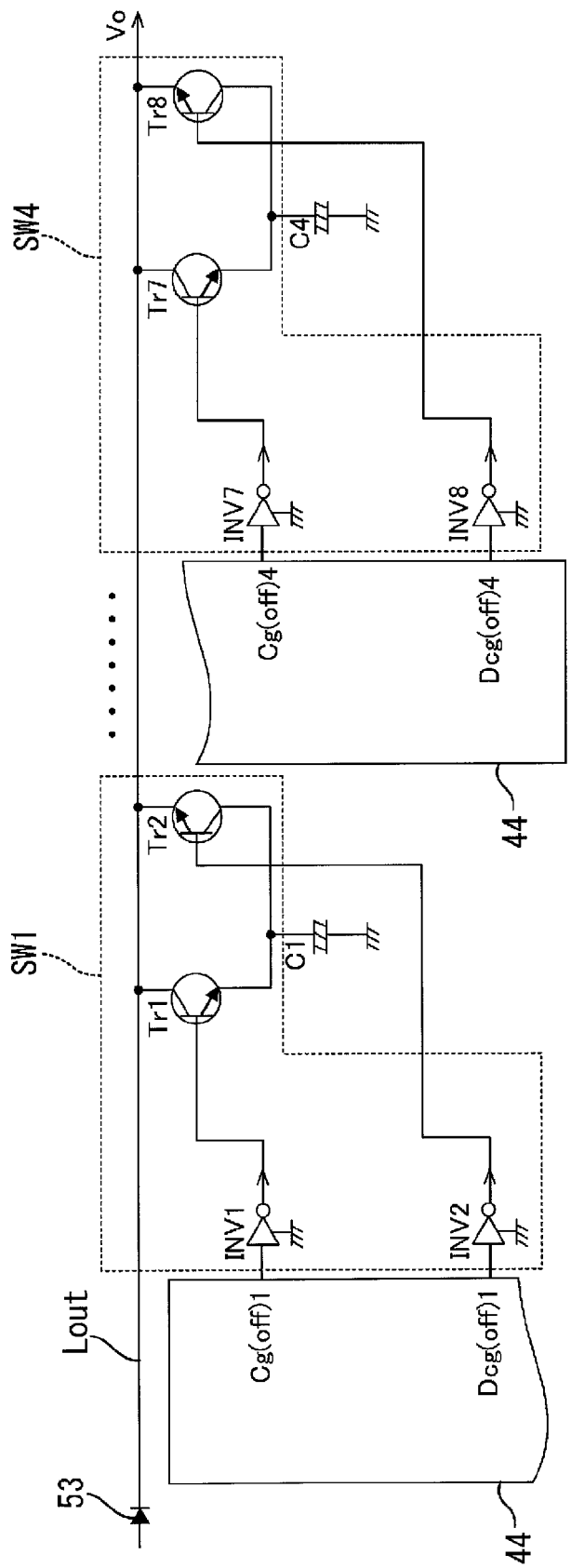
FIG. 3 is a circuit diagram schematically illustrating a configuration related to a capacitor switching circuit.

Next, the configuration of the LED backlight 15 (an example of a light emitting device) will be explained with reference to FIGS. 2 and 3. FIG. 2 is a block diagram that schematically illustrates the electrical configuration of the LED backlight 15 of the liquid crystal display device 10. FIG. 3 is a block diagram that schematically illustrates the configuration related to the capacitor switching circuits (SW1 to SW4). Only two capacitor switching circuits (SW1, SW4) are illustrated in FIG. 3. The configurations of the capacitor switching circuits (Sw1 to SW4) are the same.

The LED backlight 15 includes the LED panel 20 and the LED controller 33 (a light emitting component drive circuit).

The LED controller 33 includes a voltage measurement circuit 45, a voltage generator 50, and a drive controller 40. The LED panel 20 may only include the light emitting section 20A and the driver section 20B may be included in the LED controller 33.

The voltage measurement circuit 45 includes a voltage measurement resistor (not illustrated). The voltage measurement circuit 45 is configured to measure voltages (VP1 to VP4) at connecting points (P1 to P4) at which the LED lines (LA1 to LA4) are connected to the corresponding drive switches (Q1 to Q4), respectively, in the respective LED channels (Lch1 to Lch4) (a voltage measurement step). The voltage measurement circuit 45 is configured to measure a drive voltage Vo commonly applied to the LED channels (Lch1 to LCh4). The voltage measurement circuit 45 is configured to convert the measured voltages (VP1 to VP4) to digital signals and to supply the digital signals to the drive control circuit 40. The voltage measurement circuit 45 may be included in the drive controller 40 except for the voltage measurement resistor.

Each measured voltage VP by the voltage measurement circuit 45 corresponds to a voltage calculated by subtracting the forward voltage Vf of the corresponding LED line LA from the drive voltage Vo. The measured voltage VP also corresponds to a voltage calculated by adding a voltage drop Vr by the corresponding current control circuit (IG1, IG2, IG3, or IG4) to a voltage drop (a drain-source voltage) by an on resistance of the driving switch (Q1, Q2, Q3, or Q4). Namely, the measured voltage is expressed by the following equation based on the relationships of voltages expressed by an equation Vo=Vf+Vds+Vr.

$$VP = Vo - Vf = Vds + Vr \qquad (1)$$

Namely, among the LED channels Lch, higher the forward voltage Vf, lower the measured voltage VP when the predetermined drive voltage Vo is applied.

The voltage generator 50 includes a voltage step-up section 50A and a rectifier section 50B. The voltage step-up section 50A includes a transformer driver 51 and a transformer 52. The voltage step-up section 50A is configured to induce a predetermined level of high AC voltage in the secondary winding L2 while a current flow in the primary winding L1 is controlled by the transformer driver 51. The configuration of the voltage step-up section 50A is not limited to the above configuration. For example, the voltage step-up section 50A may include a chopper-type DC-DC converter and not include the transformer.

The rectifier section 50B includes a rectifier diode 53 and smoothing capacitors (C1 to C4). The smoothing capacitors (C1 to C4) are provided for the LED channels (Lch1 to Lch4), respectively. The number (four in this embodiment) of the smoothing capacitors (C1 to C4) is the same as the number of the LED channels (Lch1 to Lch4). Furthermore, the rectifier section 50B includes the capacitor switching circuits (an example of capacitor switching section, SW1 to Sw4) arranged between the rectifier diode 53 and the corresponding smoothing capacitors (C1 to C4).

As illustrated in FIG. 3, each capacitor switching circuit (SW1, SW2, SW3, or SW4) includes a charging transistor (a charging switch) Tr1, Tr7 and discharging transistor (a discharging switch) Tr2, Tr8. Through on and off control of these transistors, applicable one of the smoothing capacitors (C1 to C4) is connected to the rectifier diode 53. Namely, in this embodiment, the rectifier section 50B smoothes out the AC voltage using applicable one of the smoothing capacitors (C1 to C4) to generate the drive voltage Vo commonly applied to the LED channels (Lch1 to LCh4). During the voltage generation, the smoothing capacitors (C1 to C4) are switched while the charge and discharge of each smoothing capacitor (C1, C2, C3, or C4) is more appropriately controlled. FIG. 3 illustrates general configurations of the capacitor switching circuits (SW1, SW4) and bias circuits for the transistors are not illustrated.

The drive controller 40 may be an ACIC (an application specific IC) including a drive signal generation circuit 41, a drive voltage setting circuit 42, a memory 43, and a capacitor selecting circuit 44 as illustrated in FIG. 2. The circuits included in the drive controller 40 may be individually provided.

The drive controller 40 is configured to individually control the LED channels (Lch1 to Lch4) for lighting through control of the drive switches (Q1 to Q4). Furthermore, the driver controller 40 controls the voltage generator 50 based on the measured voltages (VP1 to Vp4) measured by the voltage measurement circuit 45. To alter the drive voltage Vo according to the lighting control on the LED channel (Lch1 to LCh4), the drive controller 40 performs the following steps. The drive controller 40 selects the smoothing capacitor C corresponding to the LED channel Lch, the measured voltage VP of which is the lowest among the at least one of the LED channels on which the lighting control is performed (a selection step). The drive controller 40 controls the voltage generator 50 to generate the drive voltage Vo using the selected smoothing capacitor C (a voltage generation step).

The reason why the smoothing capacitor C corresponding to the LED channel Lch, the measured voltage VP of which is the lowest among the at least one of the LED channels on which the lighting control is performed, is as follows. When a plurality of the LED channels Lch are driven, the following control is required to properly drive each LED channel Lch. The drive voltage Vo corresponding to the LED channel Lch, the forward voltage Vf of which is the highest among the plurality of driven LED channels Lch, is generated and applied to each LED channel. According to the relationship expressed by equation (1), the smoothing capacitor C corresponding to the LED channel Lch, the forward voltage Vf of which is the highest, is the smoothing capacitor C corresponding to the LED channel Lch, the measured voltage VP of which is the lowest. Each smoothing capacitor C charges the drive voltage Vo that is set for proper driving of each LED channel (Lch1, Lch2, Lch3, or Lch4), which will be explained later.

Specifically, the drive signal generation circuit 41 generates drive signals (Gc1 to Gc4) individually based on the LED data from the image data processing circuit 31. In this embodiment, the drive signals (Gc1 to Gc4) are PWM signals containing predetermined PWM values (or duty ratios). The drive signals are generated in synchronization with a frame period and input to the respective FETs (Q1 to Q4) of the LED panel 20 through gates.

The drive voltage setting circuit 42 performs the following determination for altering lighting status of each LED channel (Lch1, Lch2, Lch3, or Lch4) based on the LED data from the image data processing circuit 31. The drive voltage setting circuit 42 determines that at least one of the LED channels (Lch1 to Lch4) on which the lighting control is performed is the LED channel Lch, the measured voltage of which is the lowest, based on the measured voltages (VP1 to Vp4). Then, the drive voltage determination circuit 42 controls the voltage generator 50 to generate the drive voltage Vo using the selected smoothing capacitor C.

The drive voltage setting circuit 42 and the capacitor selecting circuit 44 control the charging transistors and the discharging transistors for the respective smoothing capacitors to maintain the unselected smoothing capacitors as follows. The unselected smoothing capacitors remain charged substantially at target charge voltages predetermined for the smoothing capacitors, respectively (the drive voltages Vo for the respective LED channels (Lch1 to Lch4) in this embodiment).

In this embodiment, when the liquid crystal display device 10 is turned on, the drive voltage setting circuit 42 controls the voltage generator 50 to apply the predetermined drive voltages Vo to the respective LED channels. The voltages (VP1 to VP4) at the connection points (P1 to P4) at the time are measured by the voltage measurement circuit 45. The drive voltage setting circuit 42 determines a sequence of the voltages (VP1 to VP4) according to the levels thereof and store the result of the determination in the memory 43. To alter the drive voltages Vo according to the lighting control on the LED channels (Lch1 to Lch4), the drive voltage setting circuit 42 determines which smoothing capacitor C to be used based on the result of the determination regarding the voltages (VP1 to VP4) stored in the memory 43.

The memory 43 stores programs related to operation of the drive controller 40 and data on measurements. The memory 43 stores the measured voltages (VP1 to Vp4).

The capacitor selecting circuit 44 generates charging off signals Cg(off)1 to Cg(off)4 and discharging off signals Dcg(off)1 to Dcg(off)4 for the respective smoothing capacitors (C1 to C4) according to instructions from the drive voltage setting circuit 42. The capacitor selecting circuit 44 sends those signals to the respective smoothing capacitors (c1 to C4) (see FIG. 3).

3. Alteration of Drive Voltage Vo

Figure 4:
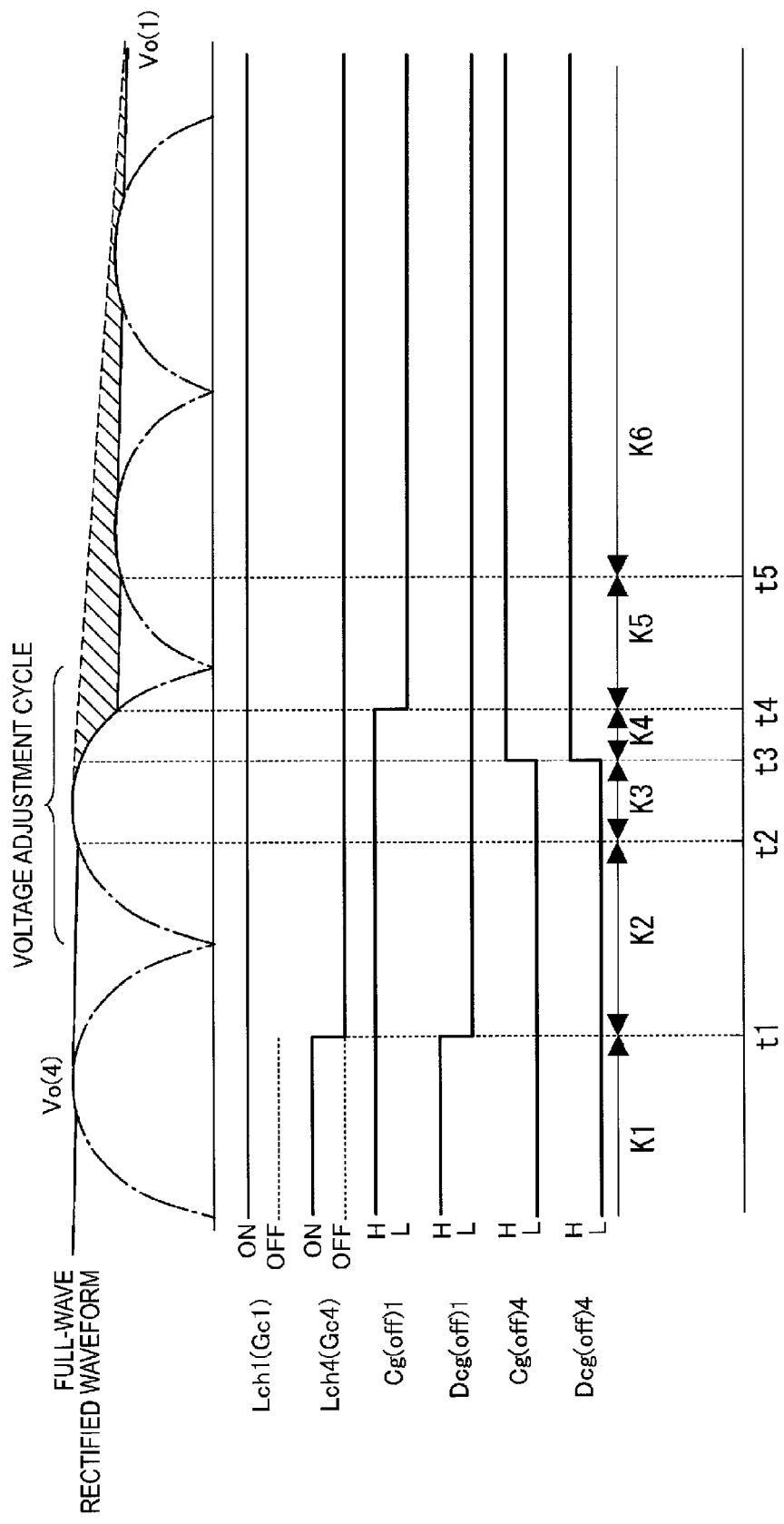
FIG. 4 is a time chart schematically illustrating transitions of signals due to alterations of a drive voltage.

Next, the alteration of the drive voltages Vo in this embodiment will be explained with reference to FIG. 4. FIG. 4 is a time chart illustrating an example of transitions of signals during the alteration of the drive voltage Vo. Logic levels of the charging off signals Cg(off)1 to Cg(off)4 and the discharging off signals Dcg(off)1 to Dcg(off)4, that is, highs and lows, are not limited to those in FIG. 4 and any levels can be used.

In the following description, the LED forward voltages Vf in the respective LED channels (Lch1 to Lch4) have the following relationships.

$$Vf(1) < Vf(2) < Vf(3) < Vf(4),$$

where Vf(1), Vf(2), Vf(3), and Vf(4) are LED forward voltages in the LED channels Lch1, Lch2, LCh3, and Lch4, respectively.

The measured voltages (Vp1 to Vp4) at the connecting points (P1 to P4) for the predetermined drive voltage Vo have the following relationships.

$$VP4 < Vp3 < VP2 < VP1$$

If the drive voltages Vo for the respective LED channels (Lch1 to Lch4) are Vo(1), Vo(2), Vo(3), and Vo(4), relationships regarding levels thereof are expressed by as follows.

$$Vo(1) < Vo(2) < Vo(3) < Vo(4)$$

Furthermore, the voltages V(c1), V(c2), V(c3), and V(c4) that are stored when the smoothing capacitors (C1 to C4) are not selected and stored substantially have the following relationships.

$$V(c1) = Vo(1) = Vf(1) + Vds1 + Vr1$$

$$V(c1) = Vo(1) = Vf(2) + Vds2 + Vr2$$

$$V(c1)=Vo(1)=Vf(3)+Vds3+Vr3$$

$$V(c1)=Vo(1)=Vf(4)+Vds4+Vr4$$

The drive voltages (Vo(1) to Vo(4)) are determined when the voltages (VP1 to VP4) are measured at the connecting points (P1 to P4). Namely, the following equation is obtained from equation (1).

$$Vf=Vo-VP \qquad (2)$$

The forward voltages (Vf(1) to Vf(4)) are calculated from equation (2). The drive voltage setting circuit 42 determines the drive voltages (Vo(1) to Vo(4)) based on the determined forward voltages (Vf(1) to Vf(4)). The drive voltage setting circuit 42 associates the determined drive voltages (Vo(1) to Vo(4)) with the LED channels (Lch1 to Lch4) and stored data on the drive voltages (Vo(1) to Vo(4)) in the memory 43, such as a RAM. The drive voltage setting circuit 42 refers to the data stored in the memory 43 according to the alterations of the lighting statuses in the LED channels (Lch1 to Lch4) and alters the drive voltages Vo. The drive voltages (Vo(1) to Vo(4)) may be measured in advance, associated with the LED channels (Lch1 to Lch4), and stored in the memory such as a ROM.

As an example, a case in which the lighting status is altered from the lighting status in which two LED channels (Lch1, Lch4) are controlled and the drive voltage Vo(4) is applied to the LED channels (Lch1, Lch4) to the lighting status in which only the LED channel Ch1 is controlled will be explained. The drive voltage Vo(4) needs to be decresed to the drive voltage Vo(1) and thus the smoothing capacitor C is switched from the smoothing capacitor C4 to the smoothing capacitor C1.

In a period K1 from the beginning to time t1 illustrated in FIG. 4, the LED channel Lch4 is controlled for lighting. Therefore, the drive voltage Vo(4) is generated by discharging and charging the smoothing capacitor C4.

Next, the lighting control on the LED channel Lch4 is terminated at time T1 to alter the lighting status of the LED panel 20 as describe above, that is, transmission of the drive signal Gc4 is terminated. As a result, the discharging off signal Dcg(off)1 switches from high to low. As illustrated in FIG. 3, a high level signal is applied to a base of the discharging transistor Tr in the capacitor switching circuit SW1 via an inverter INV2. An emitter voltage of the discharging transistor Tr is higher than a base voltage, that is, the charging voltage V(c4) of the smoothing capacitor C4 is higher than the charging voltage V(c1) of the smoothing capacitor C1. Therefore, the discharge from the smoothing capacitor C1 does not occur. The reason why the discharging signal Dcg(off)1 is set to low is to prepare for the discharge by the smoothing capacitor C1. The time when the discharging off signal Dcg(off)1 is set to low is not limited to time t1 and may be any one from time t1 to time t4.

In a period K2 from time t1 to time t2, the smoothing capacitor C4 is discharged. In a period K3 from time t2 to time t3 of a voltage adjustment cycle illustrated in FIG. 4, the smoothing capacitor C4 is charged. At time t3 in the voltage adjustment cycle, the drive voltage Vo(4) drops to the predetermined voltage after the discharge of the smoothing capacitor C4 is restarted. At time t3, the smoothing capacitor C4 is disconnected from an output line Lout. Namely, the charging off signal Cg(off)4 and the discharging off signal Dcg(off)4 are high and the charging transistor Tr7 and the discharging transistor Tr8 tune off. As a result, the smoothing capacitor C4 remain charged substantially to the drive voltage Vo(4). The predetermined voltage may be a voltage close to the drive voltage Vo(4) such that the smoothing capacitor C4 remains storing the drive voltage Vo(4).

In a period K4 from time t3 to time t4, the discharge of the smoothing capacitor C4 does not occur although the period K4 is a discharging period of the smoothing capacitor C4. This is because the smoothing capacitor C4 is disconnected from the output line Lout. Therefore, the drive voltage Vo drops. The drive voltage Vo drops equal to or under the base voltage of the discharging transistor Tr2 at time t4, that is, the drive voltage Vo becomes lower than the charging voltage V(c1) of the smoothing capacitor C1, the discharging transistor Tr2 turns on and the discharge of the smoothing capacitor C1 starts. At time t4, the charging off signal Cg(off)1 for the smoothing capacitor C1 is low, the charging transistor Tr1 turns on, and the charging of the smoothing capacitor C1 is prepared. The time at which the charging off signal Cg(off)1 turns low is not limited to time t4 and may be any one from time t4 to time t5 (a period K5).

In a period K5 from time t4 to time t5, the smoothing capacitor C1 is discharged. In a period K6 after time t6, smoothing operation is performed by the smoothing capacitor C1 and the drive voltage Vo(1) is applied. As a result, the LED channel Lch1 is turned.

On and off control of the charging transistors (Tr1, Tr7) and the discharging transistors (Tr2, Tr8) is performed by the drive voltage setting circuit 42 and the capacitor selecting circuit 44 based on the measured drive voltages Vo by the voltage measurement circuit 45.

To alter the lighting status in which all LED channels (Lch1 to Lch4) are controlled to the lighting status in which three of them (Lch1 to Lch3) are controlled, the drive voltage Vo(4) needs to be dropped to the drive voltage Vo(3). Therefore, the smoothing capacitor C is switched from the smoothing capacitor C4 to the smoothing capacitor C3.

To alter the lighting status in which two LED channels (Lch1, Lch2) are controlled to the lighting status in which all LED channels (Lch1 to Lch4) are controlled, the drive voltage Vo(2) needs to increased to the drive voltage Vo(4). Therefore, the smoothing capacitor C is switched from the smoothing capacitor C2 to the smoothing capacitor C4.

In this embodiment, the drive voltage Vo(4) can be dropped to the drive voltage Vo(1) in the voltage adjustment cycle, which is a half of the AC voltage cycle, by switching the smoothing capacitor C from the smoothing capacitor C4 to the smoothing capacitor C1. In comparison to the case in which the smoothing capacitor is not switched as illustrated by a broken line in FIG. 3, the drive voltage Vo can be quickly reduced. Therefore, a power loss corresponding to a hatched area in FIG. 3 does not occur.

If the smoothing capacitor C is not switched, the drive voltage Vo exponentially drops to the altered drive voltage Vo(1) according to a time constant defined by the capacitance of the smoothing capacitor C and the circuit resistance as illustrated by the broken line in FIG. 3. Therefore, the power illustrated by the hatching area in FIG. 3 is unnecessarily consumed by the drive switch (FET) Q1.

4. Effects of this Embodiment

In this embodiment, a plurality of the smoothing capacitors (C1 to C4) are provided for the respective LED channels (Lch1 to Lch4). To alter the drive voltage Vo according to the lighting control on the LED channels (Lch1 to Lch4), the LED channel Lch, the measured voltage VP of which is the lowest, is selected from the at least one of the LED channels under the lighting control. Namely, the smoothing capacitor C corresponding to the LED channel Lch that includes the light emitting component line LA, the forward voltage Vf of which is the highest. Then, the drive voltage Vo is generated using the selected smoothing capacitor. To alter the driver voltage Vo, the smoothing capacitors (C1 to C4) are switched among them while the smoothing capacitors (Ca to C4) are maintained at the desired charge voltage, that is, the appropriate drive voltages (Vo(1) to Vo(4)). In comparison to the configuration in which the smoothing capacitors C are not switched to reduce the drive voltage Vo, the drive voltage Vo can be promptly altered. Especially when the drive voltage Vo is reduced, this configuration can certainly reduce the power loss due to the alteration of the drive voltage Vo. Therefore, in the LED backlight 15 that includes the LED lines LA having variations, the power loss due to the alteration of the drive voltage Vo can be properly reduced.

By switching the smoothing capacitors (C1 to C4) maintained at the desired charge voltages (Vo(1) to Vo(4)), the promptness to reduce the drive voltage Vo can be ensured regardless of the capacitances of the smoothing capacitors (C1 to C4). Therefore, the smoothing capacitors C can be provided with large capacitances and thus ripples due to switching can be reduced.

Other Embodiments

The present invention is not limited to the embodiment illustrated in the above description and the drawings. For example, the following embodiments may be included in the technical scope of the present invention.

(1) In the above embodiment, the capacitor switching circuits (SW1 to SW4) are provided for the smoothing capacitors (C1 to C4), respectively. However, the configuration is not limited to such. For example, a single capacitor switching circuit may be provided for switching the smoothing capacitors (C1 to C4). The single capacitor switching circuit may be configured to simple select an appropriate one of the smoothing capacitors (C1 to C4).

The configuration of each of the capacitor switching circuits (SW1 to SW4) is not limited to the configuration illustrated in FIG. 3. For example, the inverter INV may not be included, or the charging transistor and the discharging transistor may be FETs instead of the bipolar transistors. Furthermore, the charging switches and the discharging switches are not limited to the transistors. Each of the capacitor switching circuits (SW1 to SW4) can have any configuration as long as the charging switches and the discharging switches are configured to open and close at predetermined timing.

Furthermore, the unselected capacitors may not be maintained in conditions in which they are charged substantially at predetermined charge voltages corresponding to the respective smoothing capacitors.

(2) In the above embodiment, the light emitting components, the light emitting device, and the display panel are the LEDs, the LED backlight, and the liquid crystal panel, respectively. However, they are not limited to those. For example, the light emitting components may be LDs (laser diodes). The light emitting device may be an LED-type AURORA VISION (registered trademark).

EXPLANATION OF SYMBOLS

10: Liquid crystal display device (Display device), 11: Liquid crystal panel (Display panel), 15: LED backlight (Light emitting device), 20: LED panel, 33: LED controller (Light emitting component drive circuit), 40: Drive controller, 41: Drive signal generation circuit (Drive controller), 42: Drive voltage setting circuit (Drive controller), 44: Capacitor selecting circuit (Drive controller), 45: Voltage measurement circuit, 50: Voltage generator, C1-C4: Smoothing capacitors, LA1-LA4: LED lines (Light emitting component lines), Lch1-Lch4: LED channels (Light emitting component sets), Q1-Q4: FETs (Drive switching sections), SW1-SW4: Capacitor switching circuit (Capacitor switching sections)

The invention claimed is:

1. A light emitting device comprising:
a plurality of light emitting component sets, each set including a light emitting component line and a drive switch, the light emitting component line including a predetermined number of light emitting components connected in series, the drive switch being connected in series with the light emitting component line and switching the light emitting component line between on and off;
a voltage measurement circuit configured to measure a voltage at a connecting point between the light emitting line and the drive switch in each light emitting component set;
a voltage generator including a plurality of smoothing capacitors for the light emitting component sets, respectively, and configured to generate a drive voltage to be applied to the light emitting component sets using one of the smoothing capacitors; and
a drive controller configured to select the smoothing capacitor corresponding to the light emitting component set, the measured voltage of which is the lowest among the light emitting component sets on which lighting control is performed, to alter the drive voltage according to the lighting control on the light emitting component sets, and
control the voltage generator to generate the drive voltage using the selected smoothing capacitor.

2. The light emitting device according to claim 1, wherein the voltage generator includes a capacitor switching section to connect the selected smoothing capacitors for the drive voltage generation using the selected smoothing capacitor.

3. The light emitting device according to claim 2, wherein the capacitor switching section includes capacitor switching sections for the smoothing capacitors, respectively, and
the drive controller is configured to control the capacitor switching sections to connect the selected smoothing capacitor and to generate the drive voltage by the voltage generator using the selected smooth capacitor.

4. The light emitting device according to claim 3, wherein each of the capacitor switching sections includes a charging switch and a discharging switch, and
the drive controller is configured to
control the charging switch to connect the corresponding smoothing capacitor for charge and the discharging switch to disconnect the corresponding smoothing capacitor for discharge, and
control the charging switch of the capacitor switching section corresponding to the selected smoothing capacitor to connect the selected smoothing capacitor to generate the drive voltage by the voltage generator using the selected smoothing capacitor.

5. The light emitting device according to claim 4, wherein the drive controller is configured to control the charging switches and the discharging switches corresponding to the smoothing capacitors to connect and disconnect the smoothing capacitors, respectively, to maintain the unselected smoothing capacitors charged at target charge voltages predetermined for the unselected smoothing capacitors, respectively.

6. The light emitting device according to claim 1, wherein the light emitting components are light emitting diodes.

7. A display device comprising:
the light emitting device according to claim 1; and
a display panel configured to provide display using light from the light emitting device.

8. The display device according to claim 7, wherein the display panel is a liquid crystal display panel including liquid crystals.

9. A light emitting component drive circuit configured to drive a plurality of light emitting component sets, each light emitting component set including a light emitting component line and a drive switch, the light emitting component line including a predetermined number of light emitting components connected in series, the drive switch being connected in series with the light emitting component line and switching the light emitting component line between on and off, the light emitting component drive circuit comprising:
- a voltage measurement circuit configured to measure a voltage at a connecting point between the light emitting component line and the drive switch in each light emitting component set;
- a voltage generator including a plurality of smoothing capacitors for the light emitting component sets, respectively, and configured to generate a drive voltage applied to the light emitting component sets using one of the smoothing capacitors; and
- a drive controller configured to
  - select the smoothing capacitor corresponding to the light emitting component set, the measured voltage of which is the lowest among the light emitting component sets on which lighting control is performed, to alter the drive voltage according to the lighting control on the light emitting component sets, and
  - control the voltage generator to generate the drive voltage using the selected smoothing capacitor.

10. A method of driving light emitting component sets, each set including a light emitting component line and a drive switch, the light emitting component line including a predetermined number of light emitting components connected in series, the drive switch being connected in series with the light emitting component line and configured to drive the light emitting component line, the method comprising:
- providing a plurality of smoothing capacitors for the light emitting component sets, respectively;
- measuring a voltage at a connecting point between the light emitting component line and the drive switch in each light emitting component set;
- selecting the smoothing capacitor corresponding to the light emitting component set, the measured voltage in the voltage measurement step is the lowest, among the at least one of smoothing capacitors on which lighting control is performed to alter a drive voltage commonly applied to the plurality of light emitting sets according to the lighting control on the light emitting component sets;
- generating the drive voltage using the smoothing capacitor selected in the selecting step; and
- driving at least one of the light emitting component sets on which the lighting control is performed using the drive voltage generated in the generating step.

* * * * *